United States Patent [19]

Tsantilis

[11] Patent Number: 5,691,623
[45] Date of Patent: Nov. 25, 1997

[54] BATTERY CHARGING SYSTEM, STEPPING AND INTERACTIVELY SELF-ADJUSTING TO THE NORMAL VOLTAGE OF THE BATTERY

[76] Inventor: Eleftherios Tsantilis, 20 Kydathinaion Str, Athens 10558, Greece

[21] Appl. No.: 757,190

[22] PCT Filed: Mar. 18, 1994

[86] PCT No.: PCT/GR94/00004

§ 371 Date: Nov. 18, 1994

§ 102(e) Date: Nov. 18, 1994

[87] PCT Pub. No.: WO94/22202

PCT Pub. Date: Sep. 29, 1994

Related U.S. Application Data

[63] Continuation of Ser. No. 341,535, Nov. 18, 1994, abandoned.

[30] Foreign Application Priority Data

Mar. 19, 1993 [GR] Greece .................... 930100109

[51] Int. Cl.$^6$ .................................. H02J 7/00
[52] U.S. Cl. .................. 320/39; 320/21; 320/15; 320/32
[58] Field of Search ................ 320/39.32, 43, 320/44, 22, 21, 23, 24, 15, 16, 17, 18

[56] References Cited

U.S. PATENT DOCUMENTS

| | | | |
|---|---|---|---|
| 4,387,332 | 6/1983 | Oyamada et al. | 320/15 |
| 4,737,702 | 4/1988 | Koenck | 320/22 |
| 5,028,859 | 7/1991 | Johnson et al. | 320/15 |
| 5,204,611 | 4/1993 | Nor et al. | 320/21 |
| 5,237,257 | 8/1993 | Johnson et al. | 320/15 X |
| 5,257,320 | 10/1993 | Kuriloff | 320/21 |
| 5,291,117 | 3/1994 | Rydborn | 320/39 X |
| 5,363,031 | 11/1994 | Miller et al. | 320/21 |
| 5,391,974 | 2/1995 | Shiojima et al. | 320/35 |
| 5,420,493 | 5/1995 | Hargadon et al. | 320/15 |
| 5,449,996 | 9/1995 | Matsumoto et al. | 320/20 |
| 5,469,043 | 11/1995 | Cherng et al. | 320/31 |
| 5,489,835 | 2/1996 | Stephens et al. | 320/39 X |
| 5,583,416 | 12/1996 | Klang | 320/39 X |

FOREIGN PATENT DOCUMENTS

WO 93/05560  3/1993  European Pat. Off. ......... H02J 7/10

*Primary Examiner*—Peter S. Wong
*Assistant Examiner*—K. Shin

[57] ABSTRACT

A charging system (1) for a variety of batteries (nominal voltage, capacity, chemical components), stepping, and self-adjusting to the top-of-charge voltage of the battery (12a) by interacting with the terminal voltage of this battery in each one of a series of periodic intervals (steps). CONTROL (2) means are provided for enabling signals (4) in predetermined subintervals in each periodic interval, to control the charging process. The charging voltage parameter in the running periodic interval is set by REFERENCE VOLTAGE (10) means, based on the sample of the terminal voltage of the battery taken by READING (5) means in the beginning of the running periodic interval and slightly amplified by a predetermined factor (25%). Thereafter VOLTAGE REGULATOR(15) means regulate the voltage of the charging current according to, as this set, charging voltage parameter. Every time a sample of the terminal voltage of the battery is taken, COMPARATOR (9) means compare this sample with the one taken in the previous periodic interval and, then, the charging is proceeding when this comparison has a predetermined result (or alternately a combination or combinations of results from comparisons of more parameters), otherwise the charging process terminates.

2 Claims, 9 Drawing Sheets

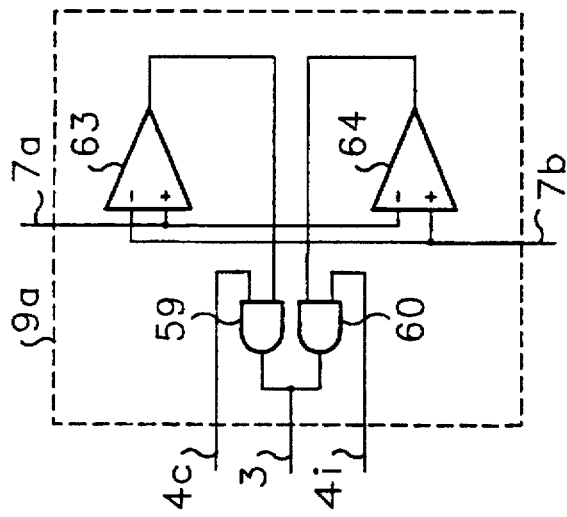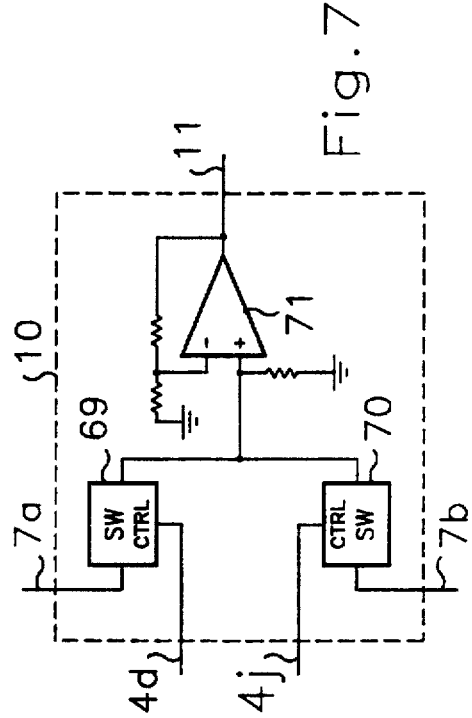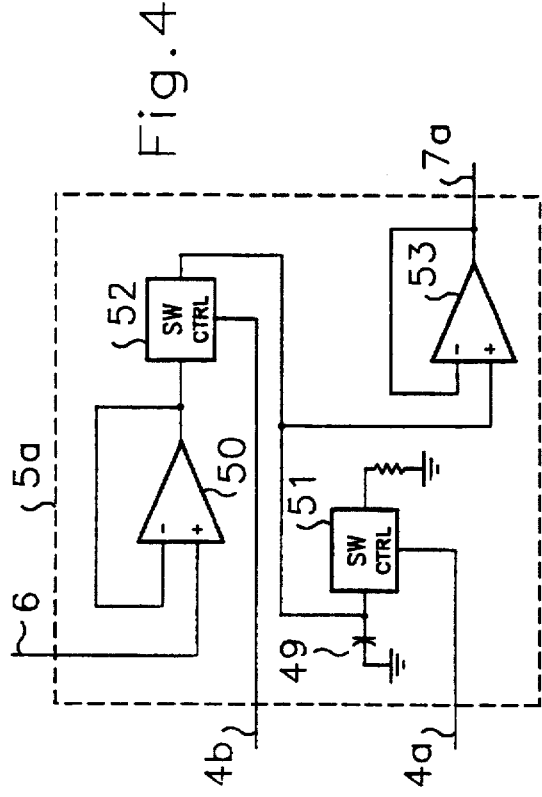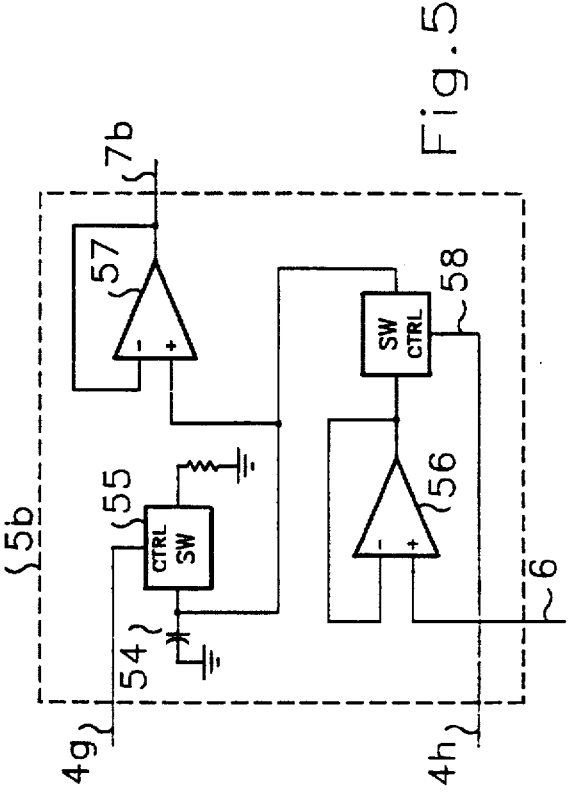

BATTERY CHARGING SYSTEM, STEPPING AND INTERACTIVELY SELF-ADJUSTING TO THE NORMAL VOLTAGE OF THE BATTERY

This is a continuation, of application Ser. No. 08/341, 535, filed Nov. 18, 1994, now abandoned.

TECHNICAL FIELD

This invention relates generally to automatically regulated charging systems for a variety of rechargeable batteries and more particularly to a charging system that progressively self-adjusts to the top-of-charge voltage of the battery by interacting with the terminal voltage of the battery, in each one of a series of periodic intervals (steps).

BACKGROUND OF THE INVENTION

In order to charge different types of batteries (nominal voltage, capacity, chemical components), the automatically regulated chargers of prior art, need first to identify each different type so that they can adjust accordingly their operating parameters for each corresponding type. But, since this identification can not be done by such a charger only on the basis of the voltage that the battery is presenting at its terminals, it becomes necessary to externally support these chargers either by equipping them with special battery housings or by placing electrical components on the batteries or eventually by using specially adapted batteries, in a way that all of these could provide to the charger an electrical Signature of each battery type. This certainly limits, physically, the use of these chargers only to those adapted batteries or to those batteries that each charger is designed for.

Therefore, it could be useful for a charger to be able to charge each one of a variety of batteries without needing to identify each different type and therefore without any external support with the consequent limitations.

The use of high charging rates, through the whole charging time, causes wear and tear to the battery. As the battery approaches full charge, its need for energy is decreasing and can not consume all of the charging current and so the rest of it is transformed to heat and gas evolution which causes tear and wear to the plates and separators and water loss to the electrolyte of the battery. This could happen, also, from the beginning of the charging when the battery is in a poor condition (age, discharged for a long time, abnormal sulfatation, etc.).

Also, constant voltage charging, under certain conditions, could cause wear and tear to the battery and sometimes could drive to thermal runaway which to certain sealed batteries (NiCd) results to battery explosion.

Therefore, it could be useful for a charger to charge a battery fast without causing any harm to it, by adjusting its operating parameters according to battery's state, in the beginning and repetitively until the end of the charging process.

Various factors, like the age of the battery, heat and high charging rates contribute to reduce the top-of-charge voltage, and so it becomes impossible to detect a formerly fixed higher value, for those chargers that relay upon the detection of a predetermined value that the terminal voltage of the battery has to reach (representing the top-of-charge state) to terminate the charging.

Such factors, sometimes, could cause short circuits (because of dendritic whiskers) between battery plates, which appear as droppings in the charging voltage and, eventually, could drive to abruptly end the charge, for those chargers that relay upon the detection of a selected slope of the charging voltage, versus time (a NiCd battery charging characteristic), to decide for a top-of-charge state of the battery, to terminate the charging ($\Delta V$ charging).

Moreover, since these short circuits increase the flow of the charging current, they could eventually mislead those chargers that relay upon the monitoring for a threshold value of the charging current, to terminate the charging.

But also, the loose character of monitoring with external temperature sensors or thermal switches (affected by ambient temperature) for a threshold value of the battery's temperature, for those chargers that relay upon this value in order to terminate the charging, could cause wear and tear and premature aging of the battery from high heat and gassing, because of the, repetitively, delayed termination of the charging.

Therefore, it could be useful for a charger to detect accurately the top-of-charge state of a battery, by avoiding to decide upon voltage or current characteristics during the charge (charging conditions), as they are subject to casual alterations, or upon external temperature switches and detectors because they are prone to ambient temperature changes.

The object of the present invention is to provide a battery charging system able to: charge one each time of a variety of rechargeable batteries without needing to identify the type of the battery and consequently without any external support; charge each battery fast without causing any harm to it, by adjusting its operating parameters according to battery's state, in the beginning and repetitively until the end of the charging process; finally, terminate the charging process when it accurately detects that the battery is in a top-of-charge state.

DISCLOSURE OF THE INVENTION

According to the present invention, an automatically regulated charging system is provided, able to charge one each time of a variety of rechargeable batteries (nominal voltage, capacity, chemical components), without needing to identify each different type and consequently without any external support like battery housings, electrical components on the batteries or eventually, specially adapted batteries.

This is attained by slicing the whole charging time in independent, short duration, periodic intervals of charging (e.g. 6 min) and proceeding by first reading, in the beginning of each such periodic interval, the battery's state and examining if the charge of the previous period has been accepted (as present terminal voltage magnitude and as a difference to the one read in the previous periodic interval) in order to decide for the continuation of the charging process (when, there is noted an increase or not of the terminal voltage of the battery) and if affirmative, then setting the charging parameters analogously to battery's state (the actually read terminal voltage of the battery) and, in turn, charging the battery in this periodic interval according to these parameters.

For this reason, means are provided for enabling in predetermined subintervals of a series of preset duration periodic intervals, control signals of operations related with the charging process. Thus, in the beginning of each running periodic interval they send a control signal to means provided, to sample the battery's terminal voltage and hold this sample, at least, until a predetermined subinterval of the next periodic interval. Then, they send (and keep active until the end of this periodic interval) a control signal to means provided, to set (and keep setting until this control signal ceases) the charging voltage parameter for this running periodic interval slightly higher (with a predetermined factor e.g. 25%), than the recently sampled and held terminal voltage of the battery. Thereafter, according to this just being set charging voltage parameter, means provided are regulating the voltage of the charging current with which, in turn, the battery is charged for this running periodic interval.

By regulating the charging voltage to be slightly higher than the sample of the terminal voltage of the battery (about 25% higher, so that the charging current should be high enough even for certain, chemical components type, batteries e.g. Nickel Hydride which have higher internal resistance than the usual) then the charging current would be high enough indeed when the charge in each periodic interval begins, but should decrease progressively (tapering) as the terminal voltage of the battery under charge, would be approaching this not so high being regulated charging voltage (depending also of the actual charge state of the battery).

Now, to find out when the battery is in a top-of-charge state in order to end the charging process, the means for enabling control signals, every time a periodic interval is finished, firstly they let pass a short duration subinterval (e.g. 1 min) of inactivity, and then (before the setting of the charging voltage parameter) they send a control signal to means provided, to compare the sample of the terminal voltage of the battery of the running periodic interval with the sample of the previous periodic interval, and to signalize a top-of-charge state in case that from this comparison there would be no sign of increase of the actual terminal voltage of the battery (although the battery had been having a periodic interval of charge) as this would be taken as a sign that the regeneration of the active materials in the battery has ceased and therefore the battery should be considered as being in a top-of-charge state. In that case, the charging process terminates.

The reliability of this way of detection of the top-of-charge state is due to the fact that the samples of the terminal voltage of the battery are not taken under charge conditions, since they are taken in the beginning of each periodic interval before the charge in this periodic interval begins (because the charging parameters for this running periodic interval are not yet set and so the voltage of the charging current should be zero) and well after is finished the charge of the previous periodic interval (to let relatively settle down the excited from the charge terminal voltage of the battery). Therefore, they are free of the symptoms that could have if they were taken under charge conditions and so they are independent of the charging characteristics of the various, chemical component's type, batteries.

By this way of progressive (stepping) charging, the battery's state (magnitude of the battery's terminal voltage) is taken into account from the beginning of the charging and the acceptance or not of the charge of each periodic interval (difference of the battery's terminal voltage of the actual periodic interval to that of the previous periodic interval) is tested in each periodic interval. Therefore, the charging starts and proceeds independently of the nominal voltage type of the battery and indeed in a very fast way, since in each periodic interval the battery is charged under constant voltage and receives as much current can absorb with its internal resistance (meaning that each different capacity type battery would receive an analogous charging current, since a high capacity battery with its larger plate surface should present a lower internal resistance and consequently would receive more charging current than a lower capacity type battery) at its actual charge state (more current for a more than a less discharged battery) and under the actually being set charging voltage in this periodic interval (e.g. 25% higher than the recent Sample of the terminal voltage of the battery).

In another version of the present invention, because some battery types either have idiosyncratic charging characteristics, or even, when they still need charging they are not showing, practically, any increase in their terminal voltage or, in contrary, they are showing a slight decrease, for this reason, except to the comparison of the samples of terminal voltage of the running and the previous periodic interval, in assistance, there is compared by means provided, the magnitudes of the charging current which the battery was receiving in a predetermined subinterval in the last two periodic intervals, and then the charging takes an end, only in case that from these comparisons in combination there is no sign of further increase in the terminal voltage of the battery and no further decrease in the charging current.

The decrease of the charging current is taken into account here, because as the battery approaches the top-of-charge state, the charging current, for its part, decreases and this continuing decrease from periodic interval to periodic interval is a sign of still continuing charging activities on the plates of the battery and, consequently, the charging shouldn't end until there wouldn't be any other decrease in the charging current.

In still another version of the present invention, means provided, switch the connection of the charger with the battery, every time the charging of one battery is terminated, with the next battery from a series of a predetermined number and restarts the charging with the newly connected battery. Therefore, by this way, a multiplicity of rechargeable batteries in series could be charged.

BRIEF DESCRIPTION OF THE DRAWINGS

FIG. 4 is a schematic diagram of a S/H 5a circuit within FIG. 2.

FIG. 5 is a schematic diagram of a S/H 5b circuit within FIG. 2.

FIG. 6 is a schematic diagram of a COMPARATOR 9a circuit within FIG. 2.

FIG. 7 is a schematic diagram of a REFERENCE VOLTAGE 10 circuit within FIG. 2.

Figure 3:
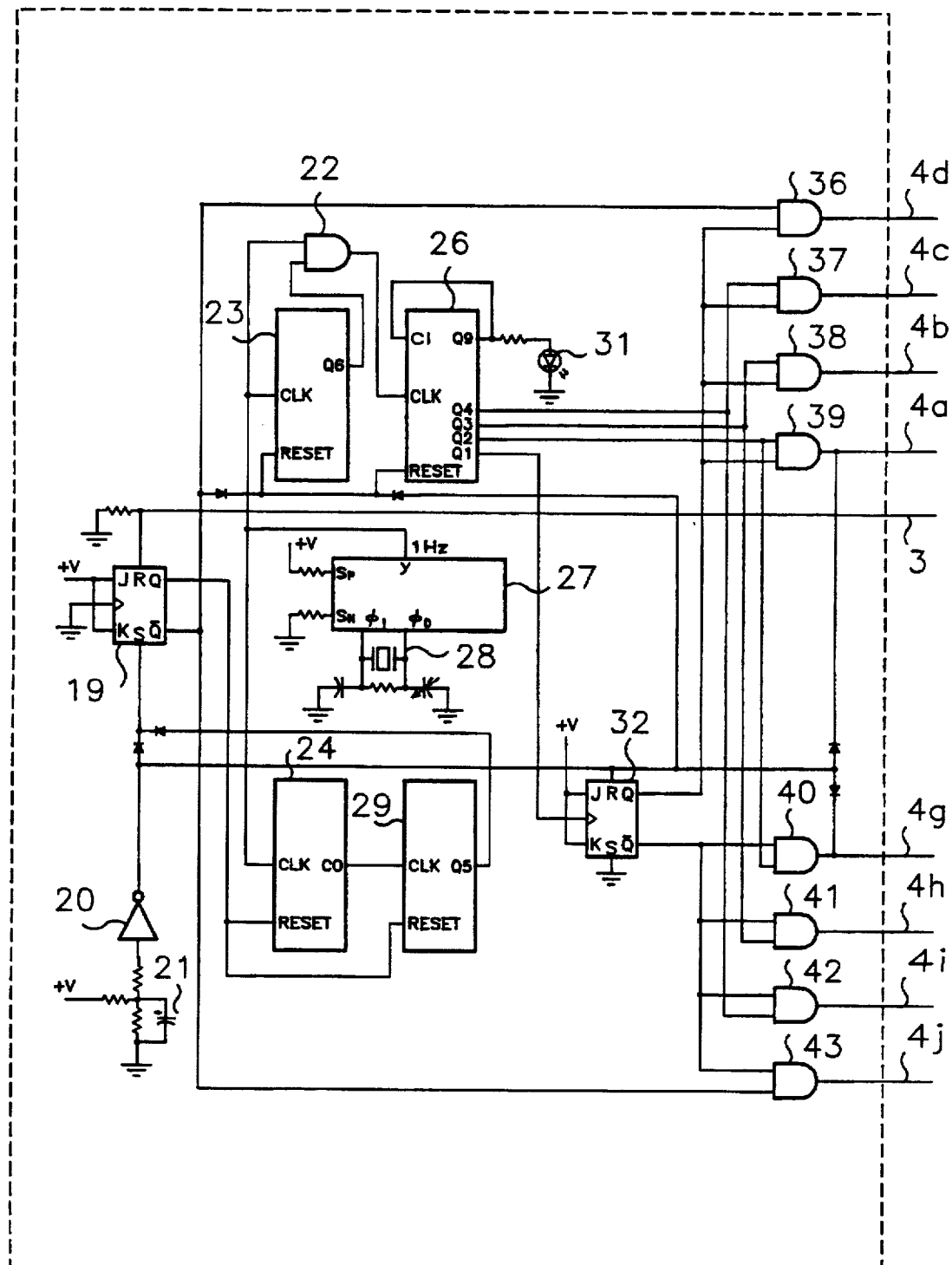
FIG. 3 is a schematic diagram of a CONTROL 2a circuit within FIG. 2.
Figure 8:
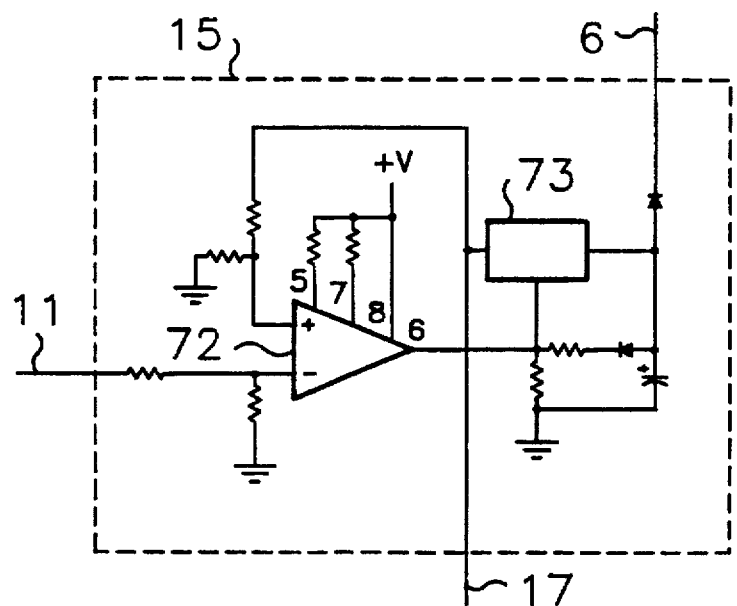
FIG. 8 is a schematic diagram of a VOLTAGE REGULATOR 15 circuit within FIG. 2.
Figure 13:
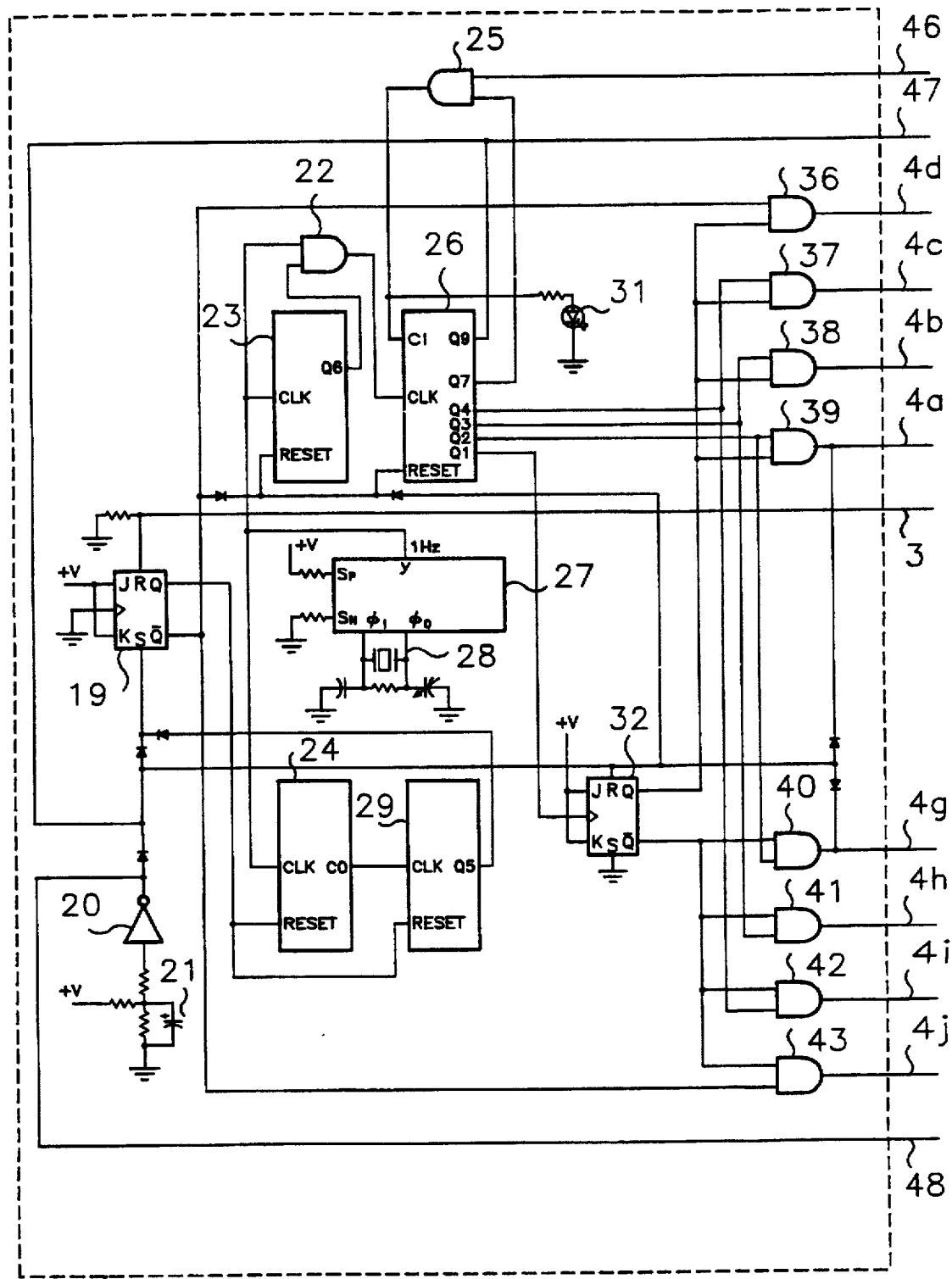

FIG. 13 is a schematic diagram of a CONTROL 2c circuit which is a modification of the CONTROL 2a circuit of FIG. 3, to suit a third preferred embodiment of a charging system according to the present invention.

Figure 14:
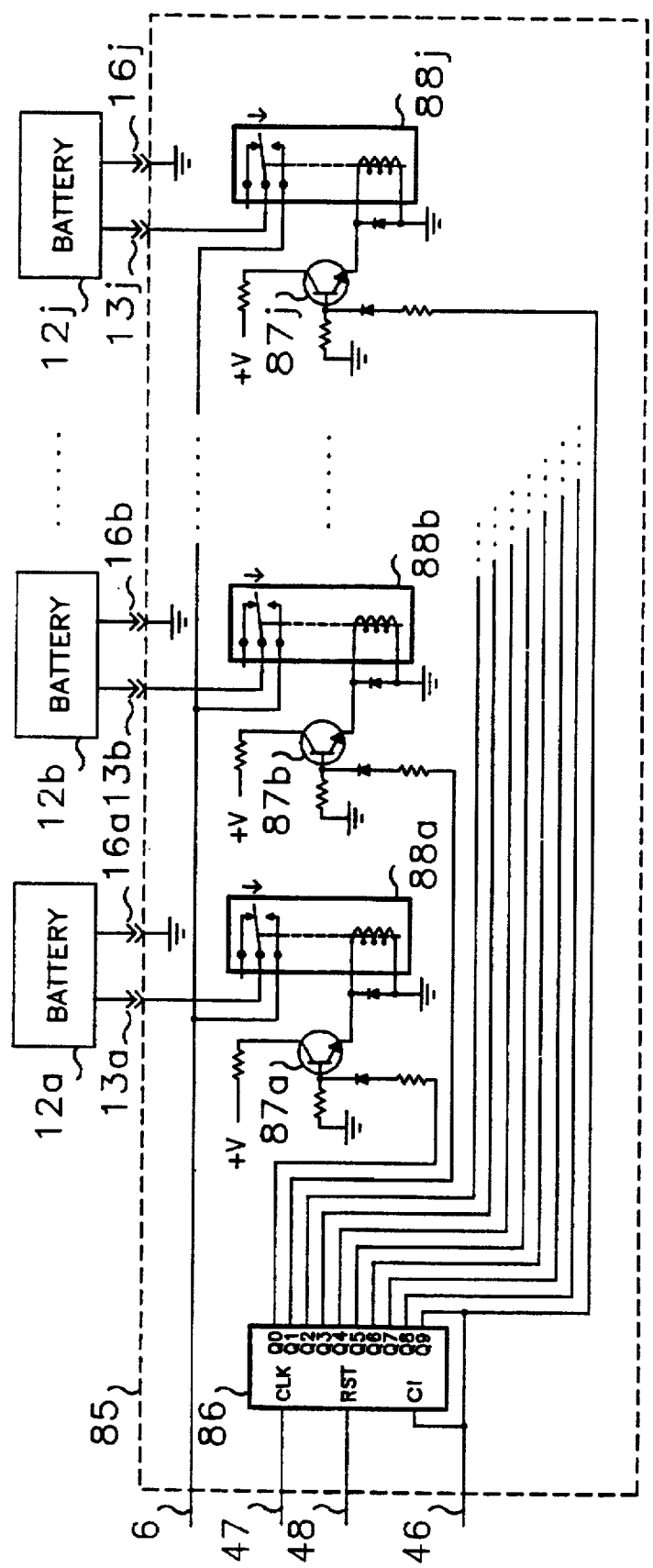

FIG. 14 is a schematic diagram of an EXTENSION 85 circuit for connecting up to ten batteries, in accordance to a third preferred embodiment of a charging system according to the present invention.

DETAILED DESCRIPTION OF THE PREFERRED EMBODIMENTS

The preferred embodiments are now described by way of illustration of the present invention and they are not intended to limit the different implementations in part or of the whole of each one of these embodiments, when the scope and the conception of this invention, as referred in the accompanying claims, is preserved.

First embodiment

Figure 1:
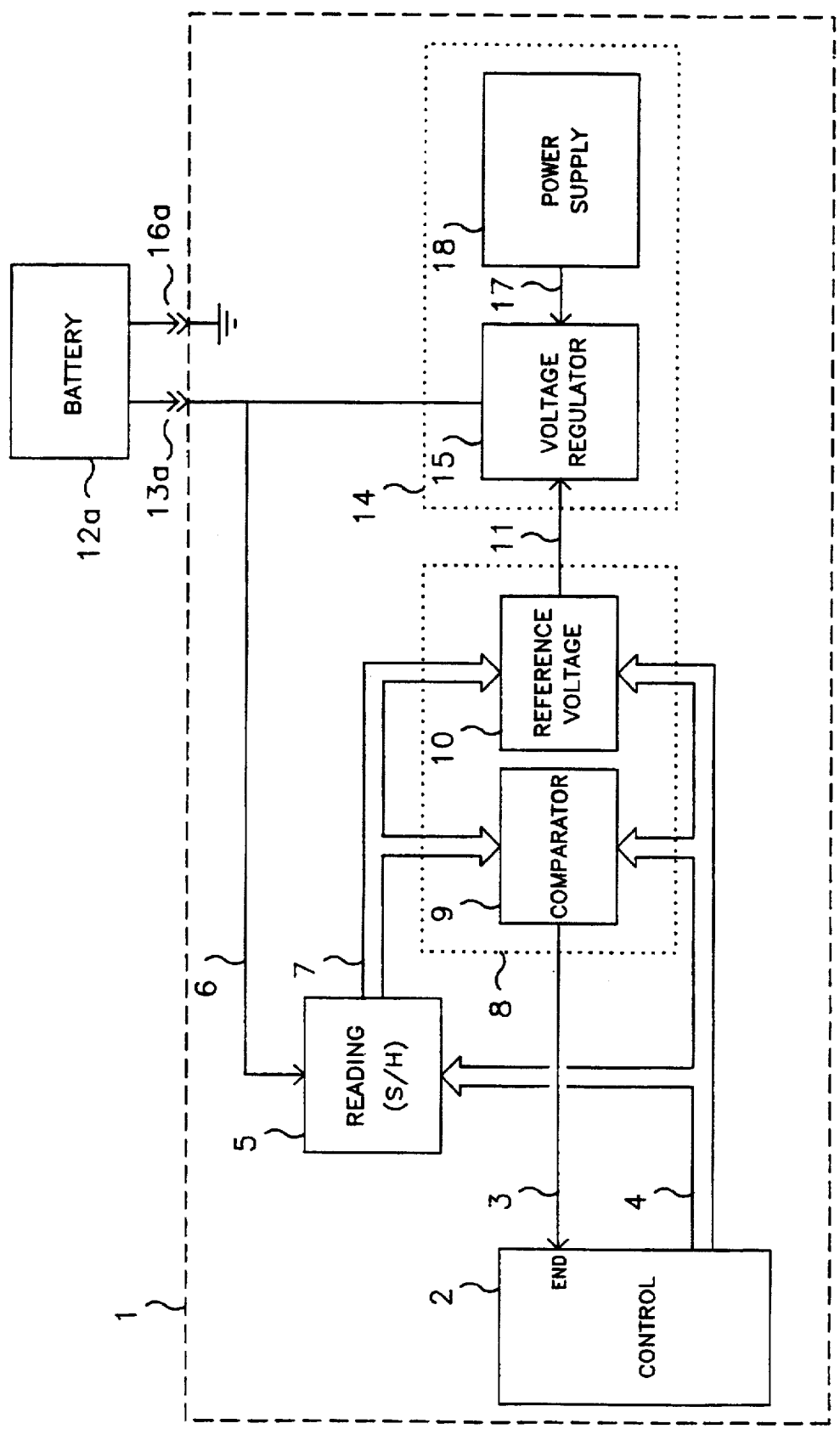
FIG. 1 is a simplified block diagram of a battery charging system according to the present invention.
Figure 2:
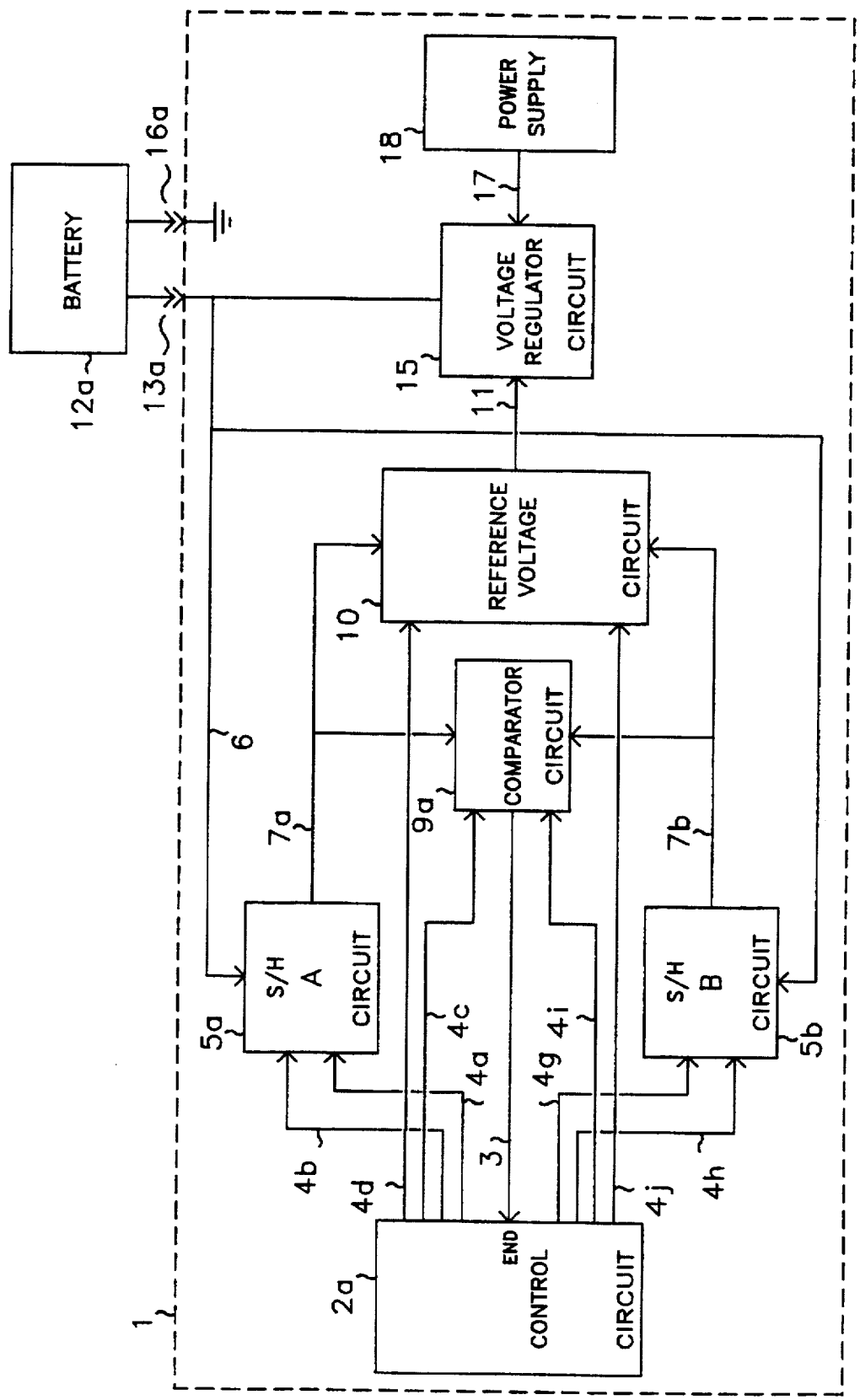
FIG. 2 is a block diagram of a first preferred embodiment of a charging system according to the present invention.

Referring to FIG. 2, there is illustrated a block diagram of a first preferred embodiment of a charging system according to the present invention that progressively self-adjusts to the top-of-charge voltage of the battery, by interacting with the terminal voltage of the battery in each one of a series of periodic intervals (steps).

The battery 12a for charging, is connected with the SYSTEM 1 via the connectors 13a and 16a. The SYSTEM 1 includes a POWER SUPPLY 18 circuit which provides current, via line 17, to a VOLTAGE REGULATOR 15 circuit which in turn regulates the voltage of this current according to a reference voltage provided via line 11 by a REFERENCE VOLTAGE 10 circuit and then the current under this so regulated voltage, via line 6 and connector 13a, is provided to the battery 12a as charging current. Understandably, if there is no reference voltage (zero), then the voltage of the charging current would be zero.

A S/H 5a circuit or a S/H 5b circuit, via line 6, can sample and hold the value of the terminal voltage of the battery, when it is activated via lines 4b or 4h correspondingly, with a (high) control signal "Sample". This S/H 5a or S/H 5b can be reset with a (high) control signal "Reset", via lines 4a or 4g correspondingly. Also, via lines 7a and 7b, the sample of S/H 5a can be compared (for being greater) to the sample of the S/H 5b and the sample of S/H 5b can be compared (for being greater) to the sample of the S/H 5a, by a COMPARATOR 9a circuit, when the latter is activated with a (high) control signal "Compare" via lines 4c or 4i correspondingly. When, the result from this comparison is positive, causes the sending, via line 3, of a (high) signal "OK" to a CONTROL 2a circuit. Also, via lines 7a or 7b, one of these samples, alternately, from one periodic interval to the other periodic interval becomes the basis on which the reference voltage parameter is set, with a predetermined factor, higher than this sample by the REFERENCE VOLTAGE 10, when the latter is activated via lines 4d or 4j correspondingly with a (high) control signal "Charge".

The CONTROL 2a is timing the periodic intervals and produces (in predetermined subintervals in each periodic interval) the control signals "Reset", "Sample", "Compare", "Charge" and also proceeds, for the sending of these signals correspondingly, via the group of lines 4a, 4b, 4c and 4d or via the group of lines 4g, 4h, 4i and 4j, alternately for each periodic interval. Now, depending the sending group, in each periodic interval: with the control signal "Reset" the corresponding S/H 5a or S/H 5b is reset; with the control signal "Sample" the corresponding S/H 5a or S/H 5b samples and holds the value of the terminal voltage of the battery 12a; with the control signal "Compare" the COMPARATOR 9a is requested to confirm (during a predetermined waiting time e.g. 1 sec) by sending a high signal "OK" via line 3 to CONTROL 2a, if the sample of S/H 5a is greater than the sample of S/H 5b or the inverse correspondingly; and finally with the control signal "Charge" (when there is confirmation with the signal "OK") the REFERENCE VOLTAGE 10 uses, via lines 7a or 7b, the held sample of the corresponding S/H 5a or S/H 5b (for as long as this "Charge" signal is kept active) as the basis for setting the reference voltage parameter, with a predetermined factor (25%), higher than this sample. According now to this reference voltage parameter, the VOLTAGE REGULATOR 15 regulates the voltage of the charging current with which in turn the battery 12a is charged. If, in the contrary, there is no confirmation with the signal "OK", during the predetermined waiting time, then the CONTROL 2a should stop sending control signals and the charging process would take an end.

By referring now, also, to FIGS. 3, 4, 5, 6, 7, 8, and 9, a more detailed description of the charging system of FIG. 2, is following.

The battery 12a for charging, is connected to the SYSTEM 1, via the connectors 13a and 16a and the SYSTEM 1 to AC Mains, via the plug 84. When, with the switch 83 the SYSTEM 1 is powered on, via the combination of transformer 80, bridge 78 and capacitor 77, a 4,5 Ah of unregulated 24 V DC is provided (in this illustrated embodiment wherein the SYSTEM 1 is able to fast charge, in two hours average time, batteries of 1.2 V–12 V nominal voltage and up to 4 Ah capacity, and eventually of greater capacity by lengthening accordingly the charging time), firstly, to a voltage regulator IC (Integrated Circuit) 82 (LM 7818) which regulates 18 V DC for the feeding and operation of the various circuits of the SYSTEM 1 and secondly, to a conventional current limiter circuit comprising the adjustable voltage regulator IC 79 (LM 338) in floating operation, and resistor 81 (for limiting this current to 4.2 Ah and by so doing, avoiding the kneeling of the POWER SUPPLY 18 by a high charging current demand and thus preserving the well feeding of the various circuits of SYSTEM 1) and therefrom, via line 17, to the VOLTAGE REGULATOR 15.

As the SYSTEM 1 is powered on, a conventional Master Reset Pulse circuit composed mainly of the inverter buffer IC 20 and capacitor 21: resets the J-K flip-flop (CD4027) IC 32 (output –Q high) and so the group of AND gates ICs 40, 41, 42 and 43 is set into service (one input high); resets the binary counter IC 23 (CD 4024) and decade counter IC 26 (CD 4017); resets the S/H 5a and S/H 5b; and finally, sets the J-K flip-flop (CD4027) IC 19 (output Q high) and therefore this high output Q, in turn, starts resetting the decade counter IC 24 (CD 4017) and the binary counter IC 29 (CD 4024), so they are both restrained to count.

Now then, in the beginning of a periodic interval only the binary counter IC 23 is counting the pulses of a conventional 1 Hz oscillator circuit which is composed mainly of the 21-stage counter IC 27 (CD 4045) and the crystal 28. After counting 64 Hz (this 64 seconds of inactivity is used later when the charge in a periodic interval is finished, to relatively settle down the excited, from the charge, voltage of the battery for ease of sampling purposes)its output Q6 goes high which, connected with the AND gate IC 22, contributes so that the 1 Hz pulses pass also to decade counter IC 26.

With the first pulse counted by decade counter IC 26 its output Q1 goes high which toggles the Flip-Flop IC 32 and so the output Q of the latter goes high which, in turn, sets now into service (one input high) the group of AND gates ICs 36, 37, 38 and 39.

With the second pulse counted by decade counter IC 26 its output Q2 goes high now, activating the in service AND gate IC 39 and so the signal "Reset" is send to S/H 5a via line 4a. This "Reset" signal activates the electronic switch IC 51 (CD 4016) which grounds the holding capacitor 49 and therefore reset the S/H 5a preparing it for a new sampling.

With the third pulse counted by decade counter IC 26, its output Q3 goes high now, activating the in service AND gate IC 38 and so the signal "Sample" is send to S/H 5a via line 4b. This "Sample" signal, by activating the electronic switch IC 52 (CD 4016) enables the sampling and holding of the value of the terminal voltage of the battery 12a, by the S/H 5a.

This S/H 5a (and the similar S/H 5b) is a conventional Sample and Hold circuit composed of the two electronic switches ICs 52 and 51 (55 and 58), the holding capacitor 49 (54) and of the two high input impedance (JFET) op-amps 50 and 53 (57 and 56).

With the fourth pulse counted by decade counter IC 26 its output Q4 goes high now, activating the in service AND gate IC 37 and so the signal "Compare" is send, via line 4c, to the AND gate IC 59 of the COMPARATOR 9a.

This COMPARATOR 9a, is composed of two op-amps (JFET) as comparators IC 63 and IC 64 circuits, and so arranged that the sample of S/H 5a is feeding the non inverting input of comparator IC 63 and the inverting input of comparator IC 64, and the sample of S/H 5b, inversely, is feeding the non inverting input of comparator IC 64 and the inverting input of comparator IC 63. By sending the signal "Compare" in one of the two inputs of one of the included AND gates ICs 59 or 60, and when there is a positive result (high output) from the comparison by the corresponding comparator IC 63 or IC 64 (as the other input of each one of these AND gates ICs 59 and 60, is connected with the output of the corresponding comparators ICs 63 and 64), then the corresponding AND gate IC 59 or IC 60 would be triggered to send the signal "OK" via line 3 to CONTROL 2a.

[Note: Because of the non ideal characteristics of the usual op-amps and also because many batteries need overcharging in order to obtain full capacity, it could be worth mentioning a variation in the implementation of the confirmation logic. So, instead of being valid only the confirmation by the COMPARATOR 9a that the recent sample is greater than the previous sample in order to continue the charging process, to be valid also, the confirmation that it is equal to the previous sample for up to a predetermined number (e.g. 8) of repetitions (periodic intervals). This limited repetition (of periodic intervals) of charge, only, in case of equality, from one hand dampens the small irregularities in the response of op-amps (comparators) When the charging is near completion and from the other hand has the advantage to allow a programmed overcharge that many batteries need in order to obtain full capacity.]

So, now the output of the comparator 63 is high because only the S/H 5a has taken a sample of the terminal voltage of the battery, therefore the "OK" signal is enabled and, via line 3, resets the Flip-Flop IC 19 of which by going high its output -Q, firstly keeps resetting the counters ICs 23 and 26, restraining them to count, while are allowed to count the counters ICs 24 and 29 and, secondly activates the, in service, AND gate IC 36 and so the signal "Charge" is send, via line 4d, to activate the electronic switch IC 69 (CD 4016) of the REFERENCE VOLTAGE 10. Thus, the sampled by S/H 5a and held value of the terminal voltage of the battery 12a, reaches, via line 7a, the (non inverting) op-amp 71 (JFET) of the REFERENCE VOLTAGE 10, whereby is amplified with a preset factor 25% and is passed, via line 11, to the VOLTAGE REGULATOR 15.

This VOLTAGE REGULATOR 15 is composed of the adjustable voltage regulator IC 73 (LM 338) and the power op-amp IC 73 (CA 3094) which acts as a difference amplifier circuit and so, according to the difference of the (continuously altered during the charging) terminal voltage of the battery 12a to the reference voltage, influences the voltage at the adjusting input of the adjustable voltage regulator IC 73, and therefore the output voltage of the latter is regulated (continuously) according to the reference voltage.

With this, so regulated voltage, the battery 12a is charged until the combination of counter IC 24 with the counter IC 29 will count 320 pulses of 1 Hz (5 min and 20 sec), driving high the output Q5 of counter IC 29 which, in turn, sets the Flip-Flop IC 19 and so, terminates one of the periodic intervals and the next one begin.

The selection of this, approximately 5.5 minutes, duration of charging has been made, by considering that it is long enough for the battery to receive a fair amount of charging current, since this is the first and consequently the higher amperage portion of the decreasing charging current as the battery's voltage approaches the set voltage of the charging current (tapering) and in contrary, it is very short for the battery to be damaged by a high current, even from some short circuits between the plates (whiskers).

Now, after some periodic interval and in the beginning of the next one, when with the signal "Compare" the confirmation of a positive result of the corresponding comparison is requested and there is no answer with the signal "OK" (which could cause the resetting of the Flip-Flop 19 and so, should start the next periodic interval, then the counter IC 26 continues to count the 1 Hz pulses until its output Q9 goes high, which connected with the input CLOCK INHIBIT of the latter causes the freezing (stand still) of this counter IC 26 and the illumination of the LED 31, indicating the end of the whole charging process.

Second embodiment

Figure 9:
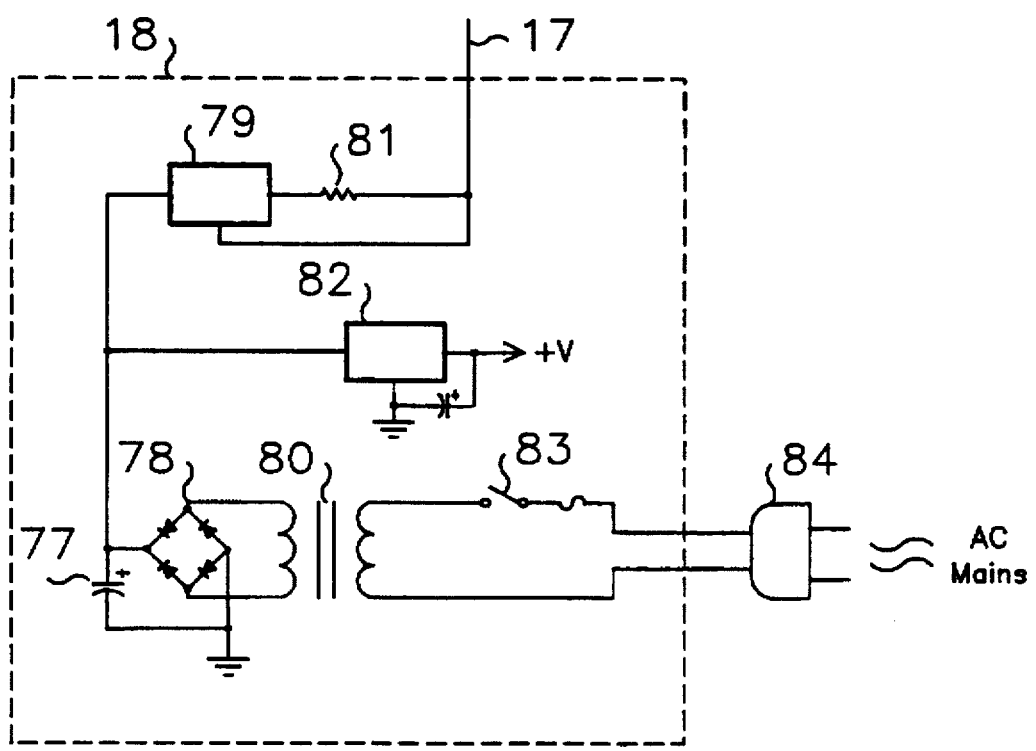
FIG. 9 is a schematic diagram of a POWER SUPPLY 18 circuit within FIG. 2.
Figure 10:
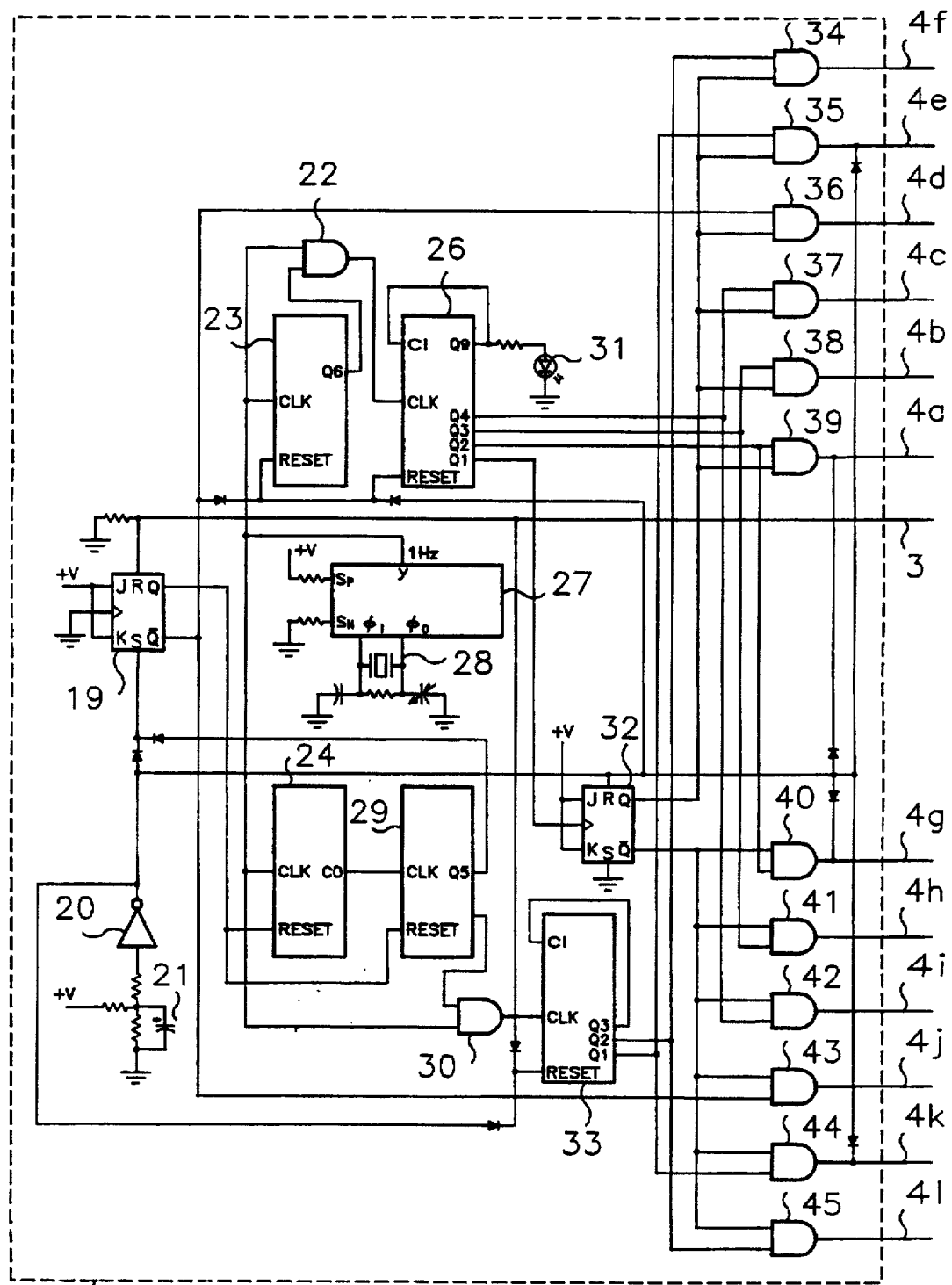
FIG. 10 is a schematic diagram of a CONTROL 9b circuit which is a modification of the CONTROL 2a circuit of FIG. 3, to suit a second preferred embodiment of a charging system according to the present invention.
Figure 12:
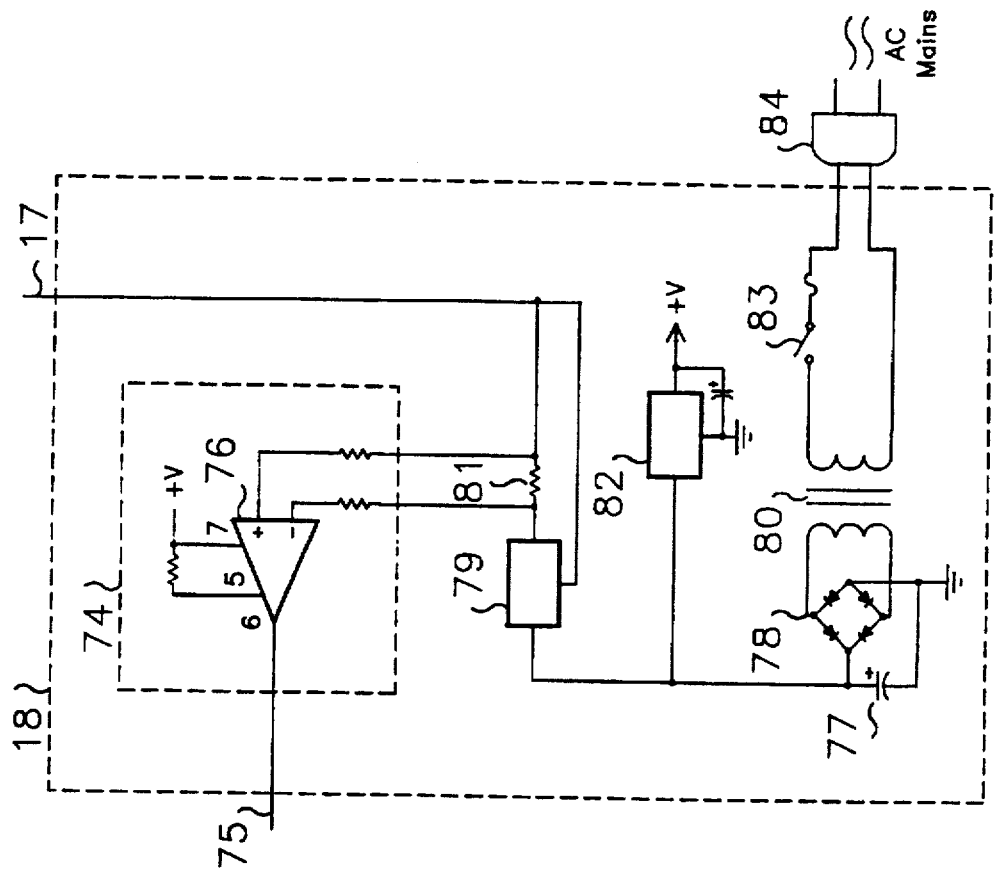
FIG. 12 is a schematic diagram of POWER SUPPLY 18 circuit which is a modification of the POWER SUPPLY 18 circuit of FIG. 9, by including an additional MONITOR 74 circuit for monitoring the potential difference across the current limiting resistor 81 of this POWER SUPPLY 18, to suit a second preferred embodiment of a charging system according to the present invention.
Figure 11:
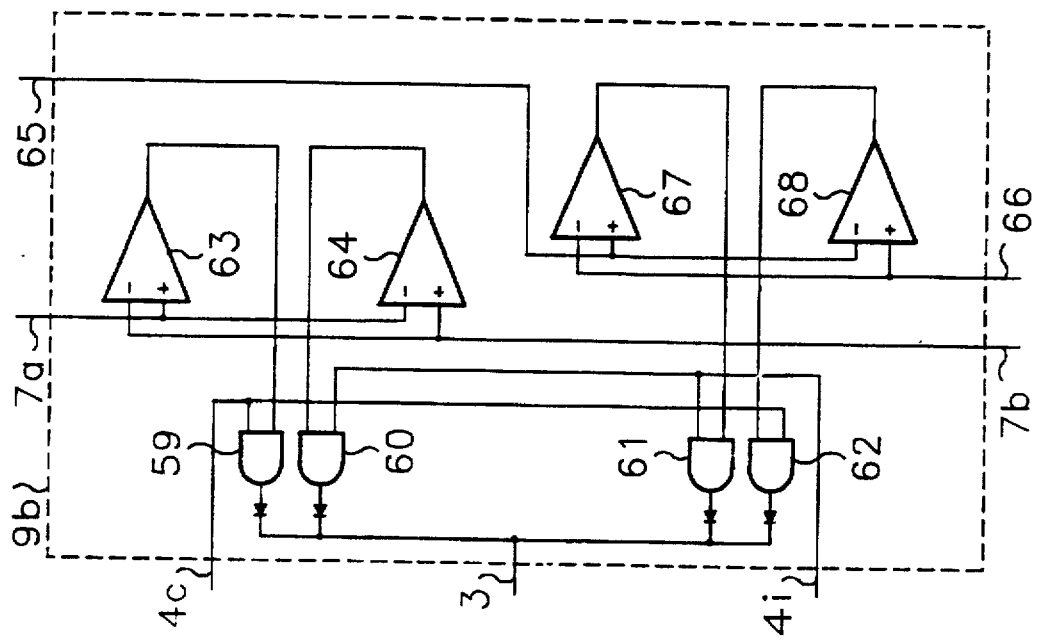
FIG. 11 is a schematic diagram of a COMPARATOR 9b circuit which is a modification of the COMPARATOR 9a circuit of FIG. 5, to suit a second preferred embodiment of a charging system according to the present invention.

By referring now, also, to FIGS. 10, 11 and 12 which are replacing the corresponding FIGS. 3, 6 and 9, there is illustrated a second preferred embodiment of a charging system according to the present invention.

This second illustrated embodiment is similar to the first embodiment with certain additions to accommodate in assistance to the comparison of magnitude of the samples of the terminal voltage of the battery, also the comparison between the magnitude of two samples of the charging current which the battery was receiving in a predetermined subinterval in the last two preceding periodic intervals, in order to decide the continuation of the charging process.

So, a MONITOR 74 circuit is added, with the op-amp IC 76 (CA 3080), acting as a difference amplifier, for monitoring the potential difference across the current limiter resistor 81 of the POWER SUPPLY 18. The magnitude of this potential difference can be sampled and held, via line 75, by the additional S/H 5c or S/H 5d circuits (similar to S/H 5a and S/H 5b and reset also by the Master Reset Pulse when the SYSTEM 1 is powered on).

The CONTROL 2b circuit is similar to the replaced CONTROL 2a except the, as follows, described differences and additions to accommodate the extra operations.

Thus, now in a periodic interval when, in the middle of the charge, the binary counter IC 29 has count 160 of the 1 Hz pulses its output Q4 goes high which connected with the additional AND gate 30 contributes so that the 1 Hz pulses can pass also to the additional decade counter IC 33 (CD 4017).

With the first pulse counted by decade counter IC 33, its output Q1 goes high activating whichever of the two additional AND gates ICs 35 or 44 is in service and so resetting the corresponding S/H 5c or S/H 5d.

With the second pulse counted by decade counter IC 33, its output Q2 goes high now, activating whichever of the two additional AND gates ICs 34 or 45 is in service and so enables the sampling and holding by the corresponding S/H 5c or S/H 5d, of the magnitude of the potential difference across the current limiter resistor 81, monitored by the MONITOR 74.

With the third pulse counted by decade counter IC 33, its output Q3 goes high now, which in turn being connected with its input CLOCK INHIBIT, causes the freezing (stand still) of this counter IC 33 (in this actual output position) by continuously inhibiting the input to the 1 Hz pulses (resetted later with the signal "OK").

The COMPARATOR 9b circuit is replacing and practically is the double of the COMPARATOR 9a of the first embodiment of the present invention and so, now, besides the samples of S/H 5a and S/H 5b which are compared by the comparators 63 and 64 correspondingly, there is compared by the two additional (op-amps) comparators 67 and 68, via lines 65 and 65, the samples of S/H 5c and S/H 5d correspondingly.

Therefore, when the signal "Compare" is send, now, here is requested to COMPARATOR 9b to confirm if the recent sample of the terminal voltage of the battery 12a is greater than the previous similar sample and, in assistance, to confirm if the recent sample of the potential difference across resistor 81 is lesser than the previous similar sample, and then, now, send the signal "OK" to CONTROL 2c, in order to continue the charging process, if either one or both of the results are positive, otherwise terminate it.

Third embodiment

By referring now, also, to FIG. 13 replacing FIG. 3 and to FIG. 14, there is illustrated a third preferred embodiment of a charging system according to the present invention. This third illustrated embodiment is similar to the first (or alternatively to the second) preferred embodiment with certain additions to accommodate the serial charging of a multiplicity of batteries (up to 10 batteries in this illustrated embodiment).

So, there is added an EXTENSION 85 circuit which is a modification of the connection between the SYSTEM 1 and the battery 12a of the first embodiment of the present invention, to facilitate the serial connection to the SYSTEM 1 of up to ten batteries for charging.

Therefore, line 6 is connected indirectly to the batteries 12a, 12b, 12c ... 12j through the relays 88a, 88b, 88c ... 88j. When, someone of the outputs Q0, Q1, Q2 ... or Q9 of the decade counter IC 86 (CD 4017) goes high, triggers the corresponding of the transistors 87a, 87b, 87c, ... or 87j, which in turn activates the corresponding relay and then the latter connects line 6 with the corresponding battery.

Also, the CONTROL 2c circuit is similar to the replaced CONTROL 2a of the first embodiment except the, as follows, differences and additions to accommodate the extra operations.

Thus, when the SYSTEM 1 is powered on, the Master Reset Pulse resets also, via line 48, the decade counter IC 86 and so its output Q0 goes high which triggers the transistor 87a and this, in turn, activates the relay 88a and therefore the first battery 12a is connected to the SYSTEM 1. Thereafter, the charging proceeds as usual.

Now, when in some periodic interval (after the signal "Compare" has been sent to the COMPARATOR 9a) there is no confirmation with the signal "OK" which would trigger another periodic interval (this is taken as meaning that the battery should be considered as being charged) then the decade counter IC 26 continues to count the 1 Hz pulses until its output Q7 goes high which is connected with the additional AND gate IC 25. Now, if in the AND gate IC 25, there is not also present a (high) signal "Last Battery", then the decade counter 26 continues to count the 1 Hz pulses until its output Q9 goes high and which, from one hand being connected via line 47 with the CLOCK input of decade counter IC 86 causes to the latter to count one pulse and therefore its output Q1 goes high which, in turn, causes the disconnection of the first battery 12a and the connection of the second battery 12b, and from the other hand, by repeating a similar action as the Master Reset Pulse (but excepting the counter 86 from this resetting) causes the beginning of another charging process, now for the newly connected battery.

Whenever, under this mode of switching connection of the batteries with the SYSTEM 1, the output Q9 of the decade counter IC 86 would go high, then it should cause from one hand the freezing (stand still) of this decade counter IC 86, since it is connected with its input CLOCK INHIBIT, and from the other hand the sending, via line 46, of the signal "Last Battery" which should stay present in the AND gate IC 25, waiting to go high the output Q7 of the decade counter IC 26. Thus, when after sometime the connected last battery 12j would be considered as being charged, then by going high also the output Q7 of the decade counter IC 26, the AND gate IC 25 would be activated, which being connected with the input CLOCK INHIBIT of the decade counter IC 26, should cause the freezing (stand still) of the latter and the illumination of the LED 31 indicating the end of the whole charging process.

I claim:

1. An integral fully automatic charging system, self-adjusting to a variety, of different voltage, capacity, chemistry and construction design types, of rechargeable batteries having a battery voltage that varies with their state of charge, comprising:

control means, for timing a series of predetermined short duration, of the order of 6 min, periodic intervals of charging, wherein each one of said periodic intervals includes an initial subinterval of inactivity of predetermined short duration, of the order of 1 min, and for enabling various predetermined control signals, during the charging process;

reading means, responsive to a first plurality of selected signals of said various control signals enabled immediately after termination of said subinterval of inactivity and connected with the battery which is selected from said variety of different voltage, capacity, chemistry and construction design types, of rechargeable batteries and connected each time to said charging system, for reading in each one of said periodic intervals, the battery's terminal voltage parameter as a parameter associated with said connected battery, and wherein said reading means includes means for sampling said battery's terminal voltage parameter in each said periodic interval and holding said sampled battery's terminal voltage parameter, at least, until after another said sampling and holding of said battery's terminal voltage parameter has been carried out in the next said periodic interval;

comparator means, connected to said reading means and responsive to a second plurality of selected signals of said various control signals, enabled after termination of said subinterval of inactivity, following said first plurality of selected signals, for comparing said sampled and held battery's terminal voltage parameter of the running said periodic interval, with said sampled and held battery's terminal voltage parameter of the immediately previous said periodic interval, and wherein said comparator means, includes means, for effecting termination of said charging process, based upon evidence that there is no increase in the value of said battery's terminal voltage parameter of any battery type—selected from said variety, of different voltage, current, chemistry and construction design types, of rechargeable batteries, and connected each time to said charging system—sampled and held in the running said periodic interval, compared to the value of said battery's terminal voltage parameter of said connected battery sampled and held in the immediately previous said periodic interval, or based upon evidence that, for a limited predetermined number of repetitions, said value of said battery's terminal voltage parameter sampled and held in the running said periodic interval is equal to the value of said battery's terminal voltage parameter of said connected battery sampled and held in the immediately previous said periodic interval;

reference voltage means, connected to said reading means, responsive to a third plurality of selected signals of said various control signals, enabled if said comparator means has not effected termination of said charging process, for setting, independently in each one of said periodic intervals, the charging voltage parameter associated with the voltage of the charging current under which is charged a different voltage type battery—selected from said variety, of different voltage, current, chemistry and construction design types, of rechargeable batteries, and connected each time to said charging system—said charging voltage parameter being set based on said battery's terminal voltage parameter of any different voltage type battery—selected from variety, of different voltage, current, chemistry and construction design types, of rechargeable batteries, and connected each time to said charging system—amplified slightly higher by a predetermined factor of the order of 1.25, constant for all of said periodic intervals, said battery's terminal voltage parameter being sampled and held in the corresponding said periodic interval; and charging means, connected to said reference voltage means and coupled to said connected battery, for allowing, in each one of said periodic intervals, the magnitude of said charging current, under regulated said voltage of the charging current in accordance with said charging voltage parameter of the corresponding said periodic interval, to vary according to internal resistance of any different capacity type battery—selected from said variety, of different voltage, current, chemistry and construction design types, of rechargeable batteries, and connected each time to said charging system—at its actual charging state.

2. A charging system as set forth in claim 1, further comprising means, connected to said control means, for switching the connection of said charging system with one battery of a series of predetermined number of said variety of different voltage, current, chemistry and construction design types, of rechargeable batteries, every time said charging process of the connected said one battery is terminated, with the next one battery of said series of predetermined number of said variety of different voltage, current, chemistry and construction design types, of rechargeable batteries and effecting restarting of said charging process with this recently connected battery of said series of predetermined number of said variety of different voltage, current, chemistry and construction design types, of rechargeable batteries.

* * * * *